(12) United States Patent
Lin et al.

(10) Patent No.: US 8,516,656 B2
(45) Date of Patent: Aug. 27, 2013

(54) COMBINATION CASTOR WHOSE CASTOR UNITS ARE BRAKED SIMULTANEOUSLY

(75) Inventors: Ming-Hsien Lin, Yongkang (TW); Feng-Hsi Yang, Tainan (TW)

(73) Assignee: Sunny Castors Co., Ltd., Tainan Hsien (TW)

(*) Notice: Subject to any disclaimer, the term of this patent is extended or adjusted under 35 U.S.C. 154(b) by 0 days.

(21) Appl. No.: 13/347,748

(22) Filed: Jan. 11, 2012

(65) Prior Publication Data

US 2013/0174377 A1 Jul. 11, 2013

(51) Int. Cl.
*B60B 33/021* (2006.01)
*B60B 33/02* (2006.01)

(52) U.S. Cl.
USPC .................... 16/35 R; 16/35 D; 188/29

(58) Field of Classification Search
USPC ............ 16/35 R, 35 D, 39, 31 R; 5/86.1; 188/19, 20, 29; 280/47.34, 47.38, 33.994
See application file for complete search history.

(56) References Cited

U.S. PATENT DOCUMENTS

| | | | |
|---|---|---|---|
| 5,012,550 A * | 5/1991 | Schlosser | 16/35 R |
| 5,450,639 A * | 9/1995 | Weismiller et al. | 5/600 |
| 5,675,864 A * | 10/1997 | Chou | 16/35 R |
| 5,765,665 A * | 6/1998 | Cheng et al. | 188/20 |
| 5,774,936 A * | 7/1998 | Vetter | 16/35 R |
| 6,170,837 B1 * | 1/2001 | Ross | 280/1 |
| 6,240,579 B1 * | 6/2001 | Hanson et al. | 5/86.1 |
| 6,264,006 B1 * | 7/2001 | Hanson et al. | 188/1.12 |
| 6,308,805 B1 * | 10/2001 | Lan | 188/20 |
| 6,363,556 B1 * | 4/2002 | Krauska et al. | 5/618 |
| 6,460,205 B1 * | 10/2002 | Lewandowski et al. | 5/600 |
| 6,478,312 B1 * | 11/2002 | Petrucci et al. | 280/11.211 |
| 6,484,359 B1 * | 11/2002 | Guttmann et al. | 16/18 R |
| 6,575,052 B2 * | 6/2003 | Toennesland et al. | 74/512 |
| 6,834,746 B1 * | 12/2004 | Lin | 188/1.12 |
| 6,951,034 B2 * | 10/2005 | Shiery et al. | 5/86.1 |
| 7,182,178 B2 * | 2/2007 | Chung | 188/1.12 |
| 7,346,942 B2 * | 3/2008 | Reinke et al. | 5/86.1 |
| 7,480,948 B2 * | 1/2009 | Reinke et al. | 5/86.1 |
| 7,516,512 B2 * | 4/2009 | Tsai | 16/35 R |
| 7,559,098 B2 * | 7/2009 | He | 5/81.1 R |
| 7,698,760 B2 * | 4/2010 | Reckelhoff et al. | 5/600 |
| 7,810,822 B2 * | 10/2010 | Figel et al. | 280/47.38 |
| 7,861,370 B2 * | 1/2011 | Chu | 16/35 R |
| 7,922,183 B2 * | 4/2011 | Figel et al. | 280/47.38 |
| 7,926,145 B2 * | 4/2011 | Liao | 16/35 R |
| 7,987,553 B2 * | 8/2011 | Lin | 16/35 R |
| 7,992,254 B2 * | 8/2011 | Ahn et al. | 16/35 R |
| 8,016,301 B2 * | 9/2011 | Figel et al. | 280/47.38 |
| 8,024,101 B2 * | 9/2011 | Froli | 701/70 |

(Continued)

*Primary Examiner* — Victor Batson
*Assistant Examiner* — Jason W San
(74) *Attorney, Agent, or Firm* — Alan Kamrath; Kamrath IP Lawfirm, P.A.

(57) ABSTRACT

A combination castor includes a control unit, a linking unit, and at least two castor units. The control unit includes at least one mounting seat, at least one bushing mounted in the at least one mounting seat, and a pedal pivotally located at a side of the at least one mounting seat. The linking unit includes a propeller shaft extended through the at least one bushing and locked onto the pedal, at least one rotation plate secured on the propeller shaft, and at least two links each pivotally connected with the at least one rotation plate and the respective castor unit. Thus, when the pedal is stepped, the propeller shaft is driven to rotate the at least one rotation plate which drives the links to operate the castor units so as to brake or position the castor units simultaneously.

4 Claims, 7 Drawing Sheets

(56) References Cited

U.S. PATENT DOCUMENTS

| | | | |
|---|---|---|---|
| 8,079,606 B2 * | 12/2011 | Dull et al. | 280/47.39 |
| 8,146,203 B2 * | 4/2012 | Pollard | 16/18 R |
| 8,201,667 B2 * | 6/2012 | Chen et al. | 188/20 |
| 8,220,110 B1 * | 7/2012 | Chen | 16/35 R |
| 8,302,257 B2 * | 11/2012 | Lin | 16/35 R |
| 2002/0033307 A1 * | 3/2002 | Mobley et al. | 188/1.12 |
| 2011/0120815 A1 * | 5/2011 | Frolik et al. | 188/1.12 |
| 2012/0031714 A1 * | 2/2012 | Chen et al. | 188/69 |
| 2012/0085595 A1 * | 4/2012 | Chen et al. | 188/1.12 |
| 2012/0199423 A1 * | 8/2012 | Heidlage et al. | 188/1.12 |
| 2012/0255141 A1 * | 10/2012 | Lin et al. | 16/45 |

* cited by examiner

COMBINATION CASTOR WHOSE CASTOR UNITS ARE BRAKED SIMULTANEOUSLY

BACKGROUND OF THE INVENTION

1. Field of the Invention

The present invention relates to a wheeled vehicle and, more particularly, to a combination castor for a cart, stroller, chair and the like.

2. Description of the Related Art

A conventional wheeled vehicle, such as a cart, stroller, chair and the like, comprises a main frame, a plurality of castors mounted on the bottom of the main frame, and a plurality of braking devices mounted on a respective one of the castors to brake and position each of the castors. However, the castors are controlled by the braking devices respectively so that a user has to lock each of the braking devices respectively so as to brake and position each of the castors and has to unlock each of the braking devices respectively so as to release each of the castors, thereby greatly causing inconvenience to the user when locking and unlocking the castors.

BRIEF SUMMARY OF THE INVENTION

In accordance with the present invention, there is provided a combination castor, comprising a control unit, a linking unit connected with the control unit, and a at least two castor units connected with the linking unit. The control unit includes at least one mounting seat, at least one bushing mounted in the at least one mounting seat and having an interior provided with a mounting hole, and a pedal pivotally mounted on a side of the at least one mounting seat and having an interior provided with a driving hole aligning with the mounting hole of the at least one bushing. The at least one mounting seat of the control unit is attached to a bottom of an object. The linking unit includes a propeller shaft extended through the mounting hole of the at least one bushing and combined with the driving hole of the pedal, at least one rotation plate secured on the propeller shaft, and at least two links each having a first end pivotally connected with the at least one rotation plate and a second end pivotally connected with a respective one of the at least two castor units.

The primary objective of the present invention is to provide a combination castor whose castor units are operated and braked simultaneously.

According to the primary advantage of the present invention, when the pedal is stepped by a user, the propeller shaft is driven to rotate the at least one rotation plate which drives the at least two links to operate the at least two castor units so as to brake or position the at least two castor units simultaneously.

According to another advantage of the present invention, the user only needs to tread the pedal so as to operate the castor units simultaneously so that the user can control the castor units easily and quickly.

According to a further advantage of the present invention, the linking unit may include multiple rotation plates and multiple links to control multiple castor units so that the number of the castor units can be increased and decreased freely, thereby enhancing the versatility of the combination castor.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-5, a combination castor in accordance with the preferred embodiment of the present invention comprises a control unit 1, a linking unit 2 connected with the control unit 1, and at least two castor units 3 connected with the linking unit 2.

The control unit 1 includes at least one mounting seat 11, at least one bushing 12 mounted in the at least one mounting seat 11 and having an interior provided with a mounting hole 13, and a pedal 14 pivotally mounted on a side of the at least one mounting seat 11 and having an interior provided with a driving hole 15 aligning with the mounting hole 13 of the at least one bushing 12.

The at least one mounting seat 11 of the control unit 1 is attached to the bottom of an object, such as a cart, stroller, chair and the like. The at least one mounting seat 11 of the control unit 1 has a top provided with a top plate 111 secured to the bottom of the object. The mounting hole 13 of the at least one bushing 12 has a hexagonal shape. The pedal 14 of the control unit 1 has two tread portions 16 formed on two opposite ends thereof. The driving hole 15 of the pedal 14 has a hexagonal shape. Each of the at least two castor units 3 is secured to the bottom of the object.

The linking unit 2 includes a propeller shaft 21 extended through the mounting hole 13 of the at least one bushing 12 and combined with the driving hole 15 of the pedal 14, at least one rotation plate 22 secured on the propeller shaft 21, and at least two links 23 each having a first end pivotally connected with the at least one rotation plate 22 and a second end pivotally connected with a respective one of the at least two castor units 3.

The propeller shaft 21 of the linking unit 2 is locked in and driven by the driving hole 15 of the pedal 14 so that the propeller shaft 21 of the linking unit 2 is locked onto and rotated by the pedal 14 of the control unit 1. The propeller shaft 21 of the linking unit 2 has a hexagonal shape. The propeller shaft 21 of the linking unit 2 is secured in the mounting hole 13 of the at least one bushing 12 so that the at least one bushing 12 of the control unit 1 is rotatable in concert with the propeller shaft 21 of the linking unit 2 and is rotatable in the at least one mounting seat 11 of the control unit 1. The at least one rotation plate 22 of the linking unit 2 is rotated by the propeller shaft 21. Each of the at least two links 23 of the linking unit 2 is driven by the at least one rotation plate 22 to drive and operate the respective castor unit 3 so as to brake the respective castor unit 3.

In the preferred embodiment of the present invention, the control unit 1 includes two mounting seats 11 and two bushings 12 each mounted in a respective one of the mounting seats 11. The pedal 14 of the control unit 1 is located at a side of one of the mounting seats 11. The combination castor comprises four castor units 3. The linking unit 2 includes four links 23 each pivotally connected with a respective one of the castor units 3, and two rotation plates 22 each pivotally connected with any two of the links 23. The propeller shaft 21 of the linking unit 2 is extended through the mounting hole 13 of each of the bushings 12, and has one end locked in the driving hole 15 of the pedal 14.

In another preferred embodiment of the present invention, the combination castor comprises six castor units 3. The linking unit 2 includes six links 23 each pivotally connected with a respective one of the castor units 3, and three rotation plates 22 each pivotally connected with any two of the links 23.

In another preferred embodiment of the present invention, the combination castor comprises eight castor units 3. The linking unit 2 includes eight links 23 each pivotally connected with a respective one of the castor units 3, and four rotation plates 22 each pivotally connected with any two of the links 23.

Figure 1:
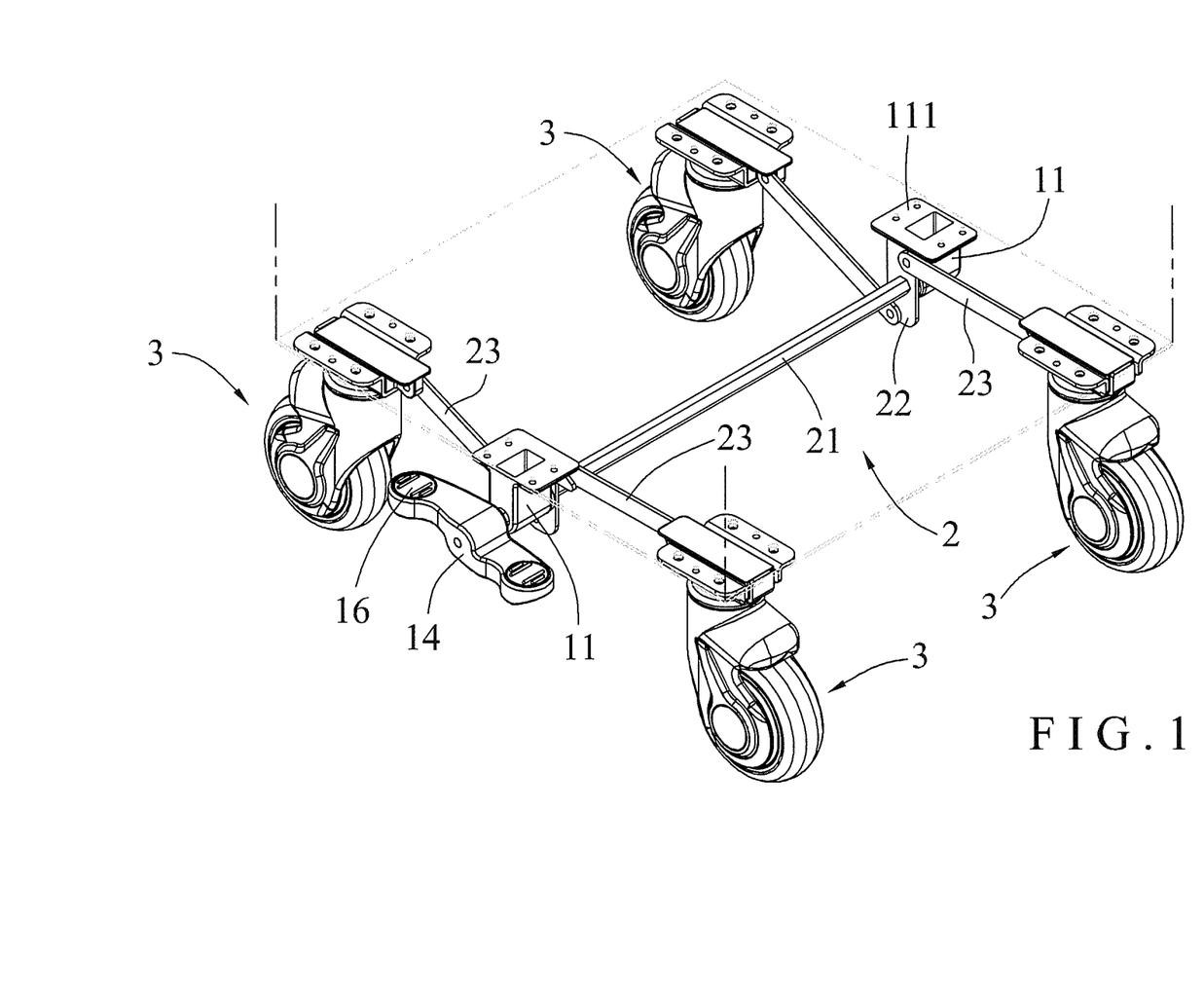
FIG. 1 is a perspective view of a combination castor in accordance with the preferred embodiment of the present invention.
Figure 2:
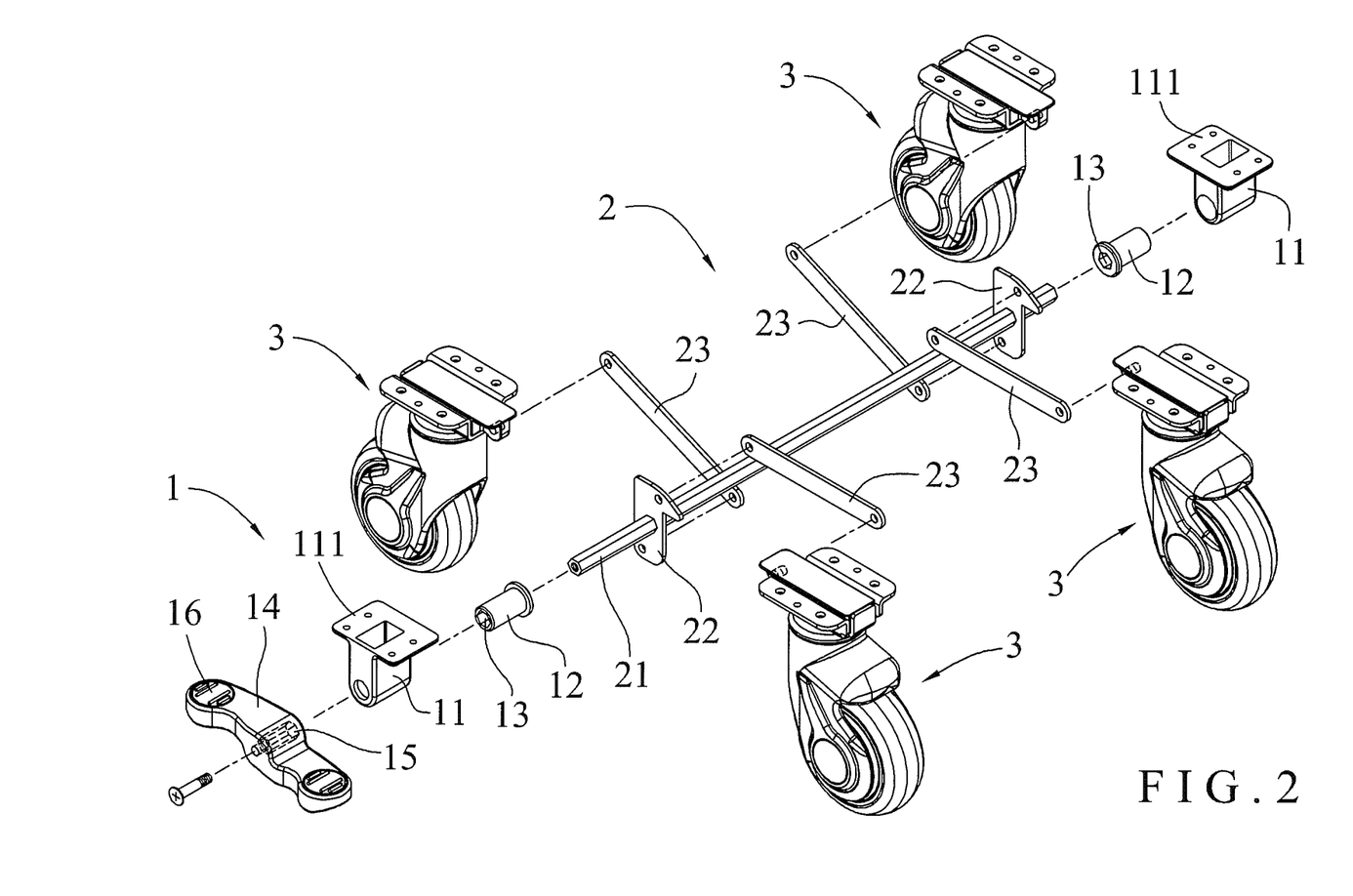
FIG. 2 is an exploded perspective view of the combination castor as shown in FIG. 1.
Figure 3:
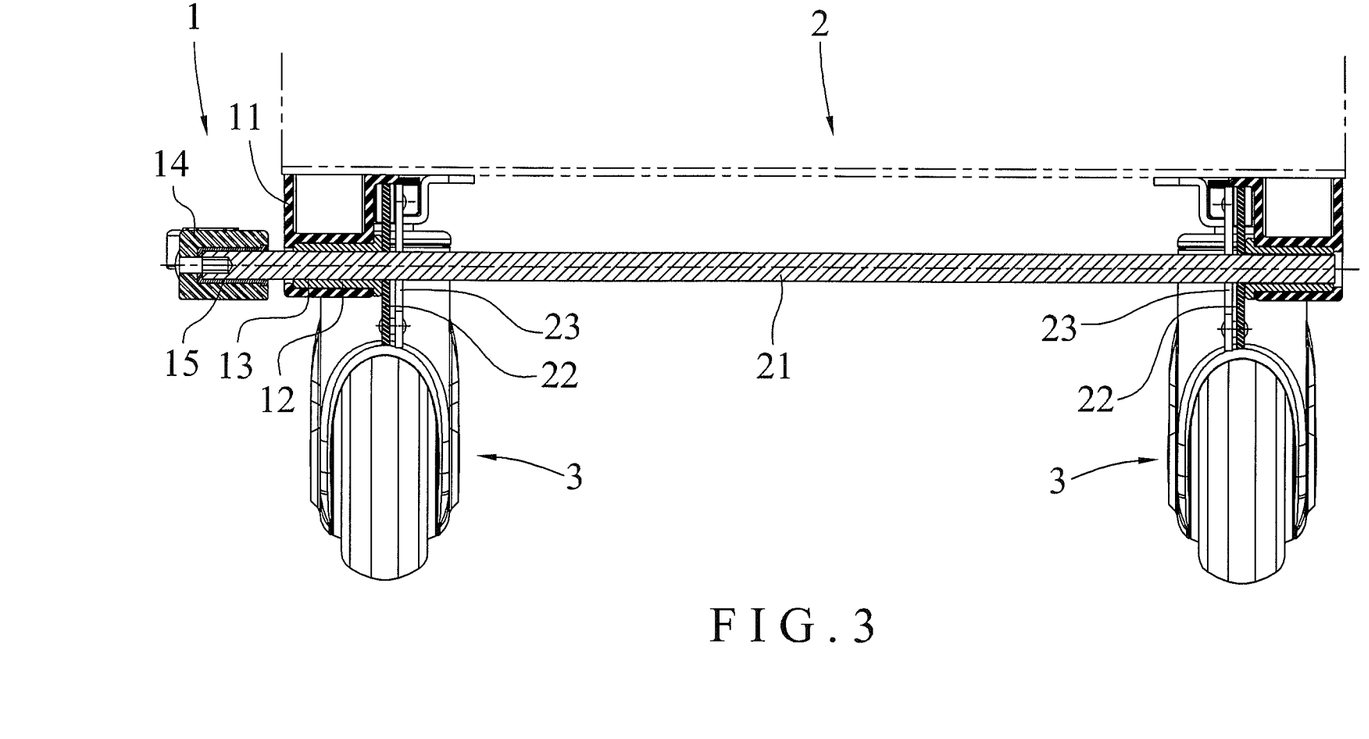
FIG. 3 is a front cross-sectional view of the combination castor as shown in FIG. 1.
Figure 4:
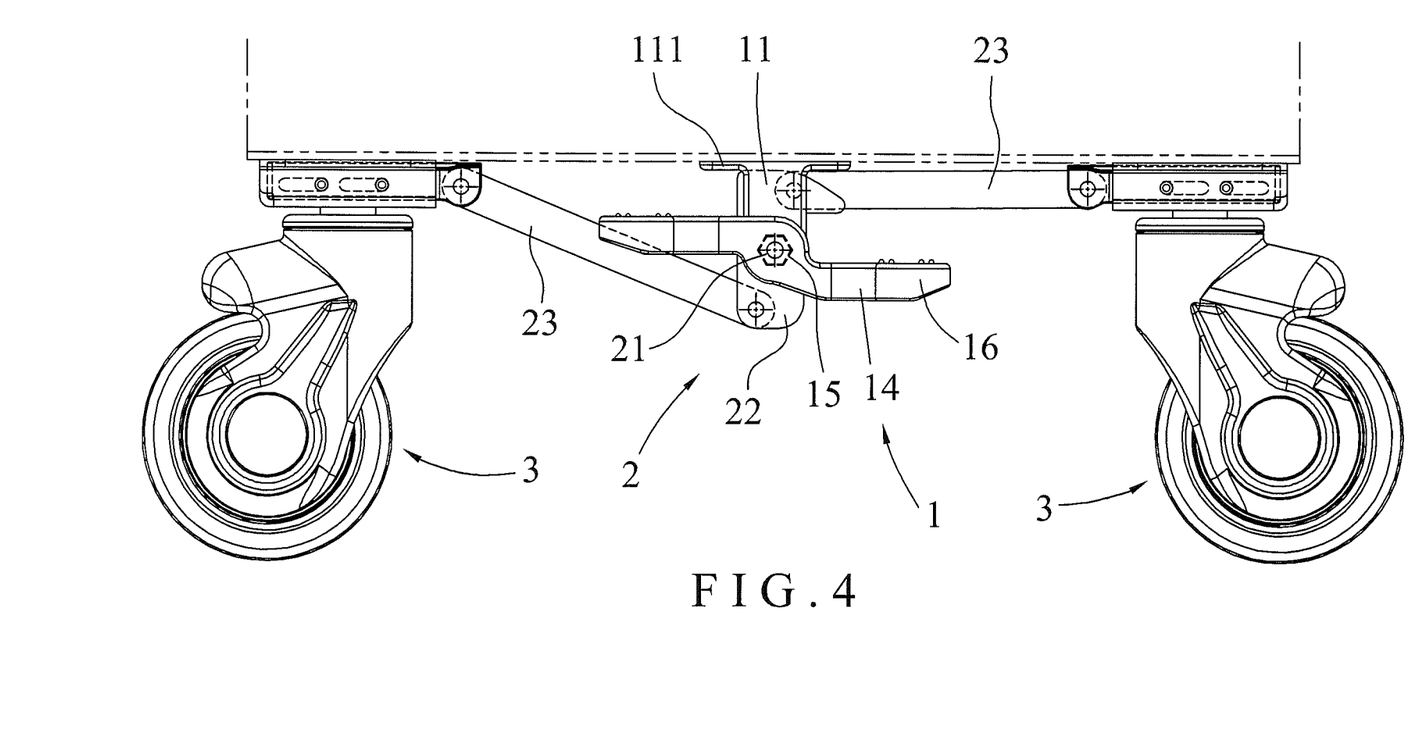
FIG. 4 is a side view of the combination castor as shown in FIG. 1.
Figure 5:
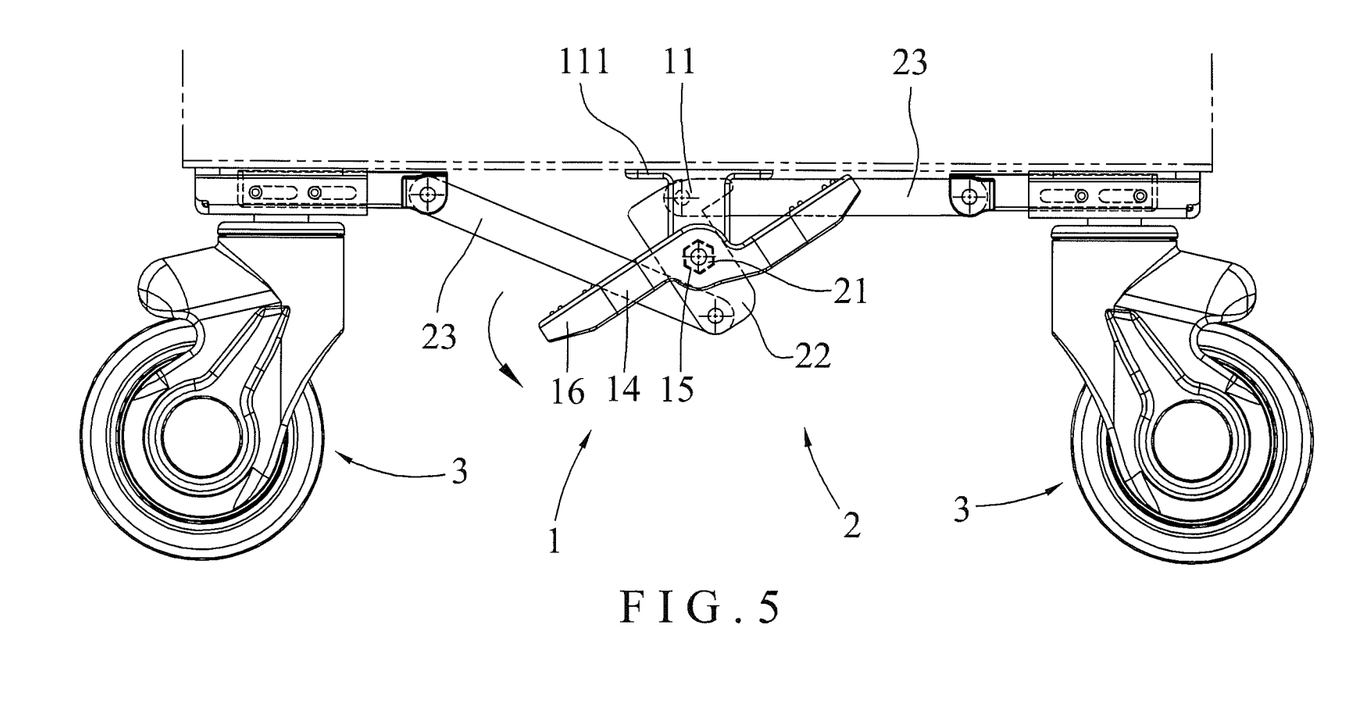
FIG. 5 is a schematic operational view of the combination castor as shown in FIG. 4.

In operation, referring to FIGS. 4 and 5 with reference to FIGS. 1-3, when one of the tread portions 16 of the pedal 14 is stepped by a user, the propeller shaft 21 of the linking unit 2 is rotated to rotate the at least one rotation plate 22 which pivots the links 23 which are pulled toward the at least one mounting seat 11 to drive the castor units 3 so as to brake or position the castor units 3 simultaneously. Thus, when the pedal 14 is stepped by a user, the propeller shaft 21 is driven to rotate the at least one rotation plate 22 which drives the links 23 to operate the castor units 3 so as to brake or position the castor units 3 simultaneously.

On the contrary, when the other one of the tread portions 16 of the pedal 14 is stepped by the user, the propeller shaft 21 of the linking unit 2 is rotated to rotate the at least one rotation plate 22 which pivots the links 23 which are pushed toward the castor units 3 to release and return the castor units 3 to the original state simultaneously.

Figure 6:
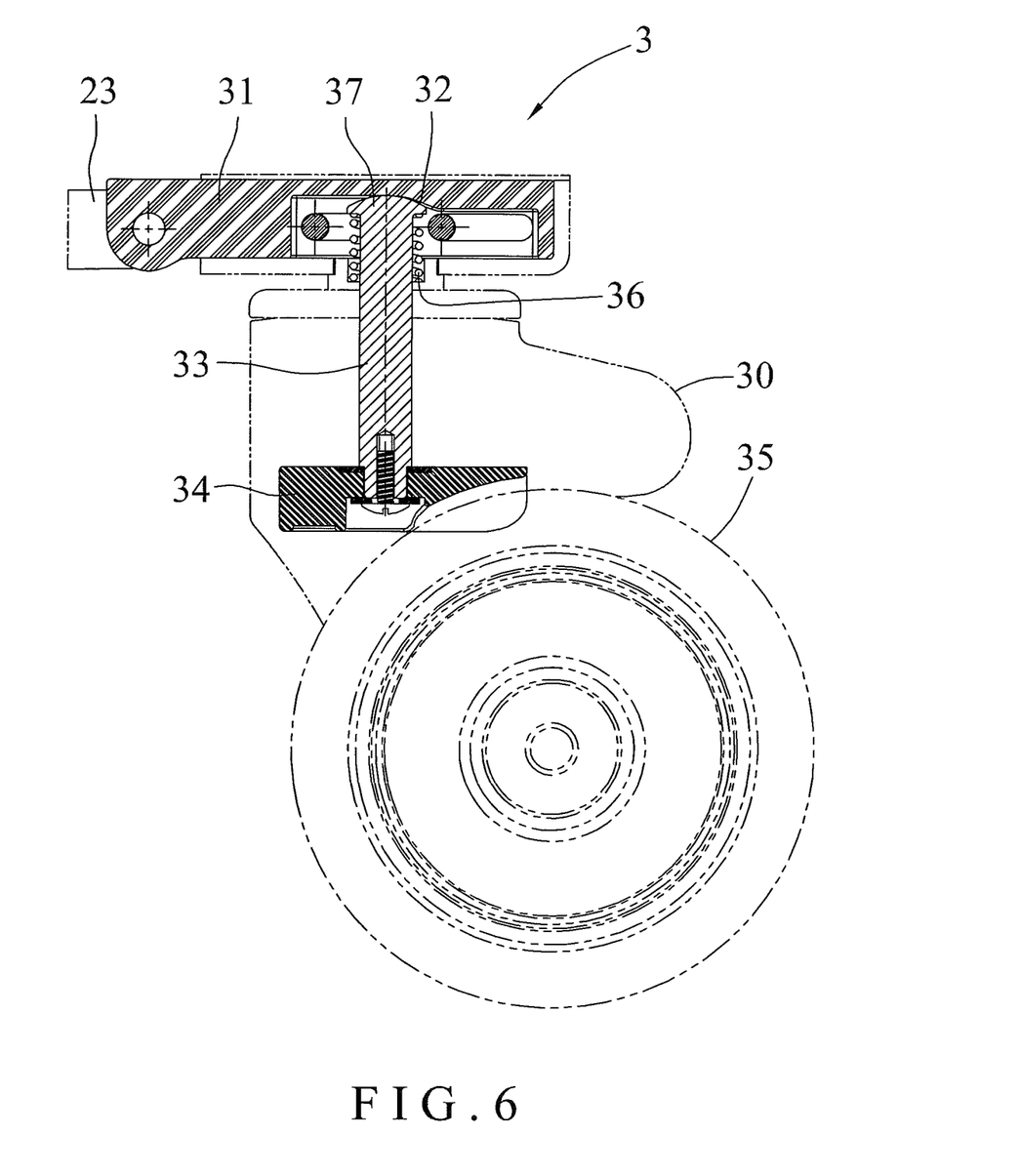
FIG. 6 is a partially side cross-sectional view of the combination castor as shown in FIG. 1.
Figure 7:
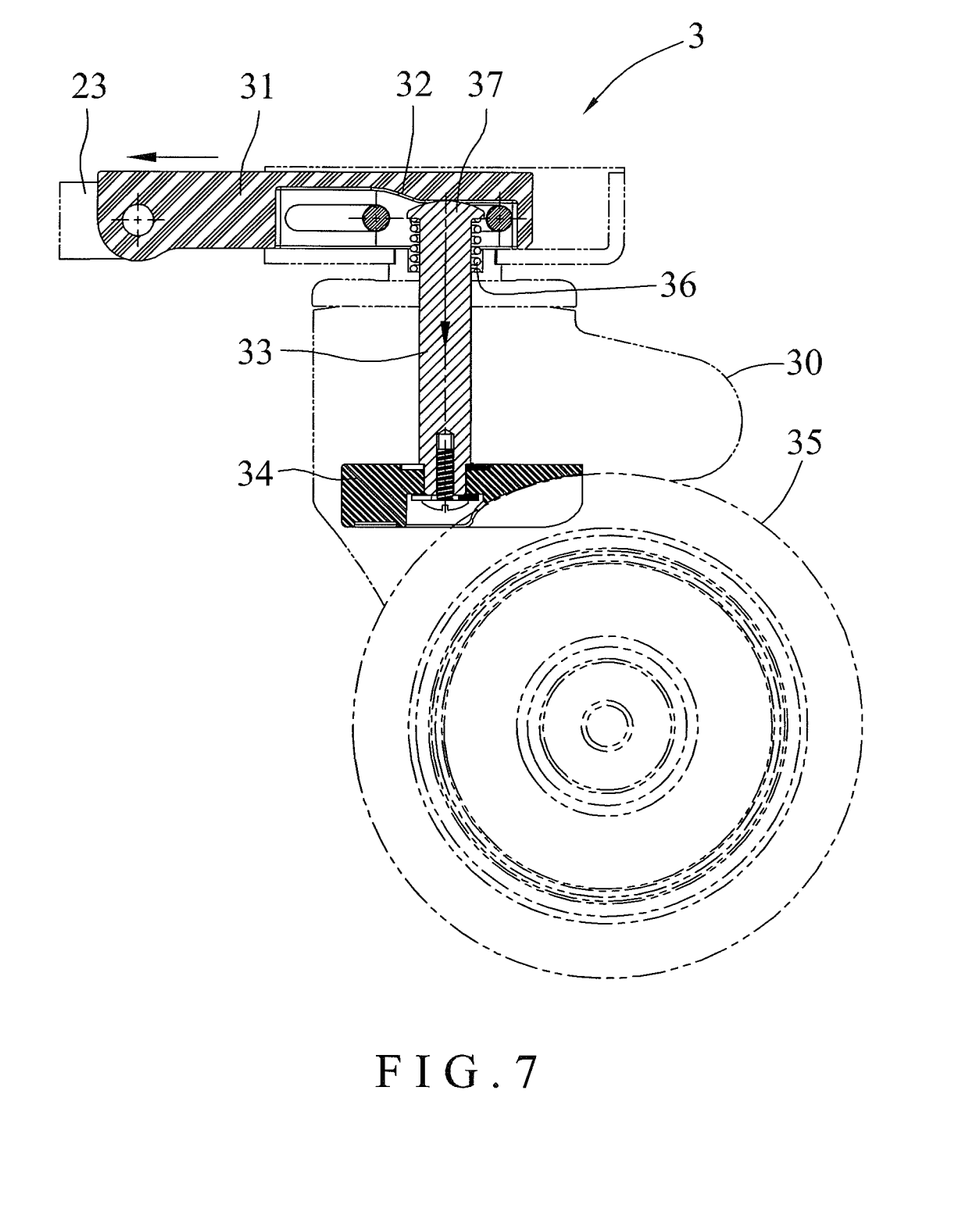
FIG. 7 is a schematic operational view of the combination castor as shown in FIG. 6.

Referring to FIGS. 6 and 7 with reference to FIGS. 1-5, each of the castor units 3 includes a housing 30, a roller 35 rotatably mounted on the housing 30, a slide 31 movably mounted on the housing 30 and having an interior provided with a pressing ramp 32, a driven rod 33 movably mounted on the housing 30 and having an enlarged upper end 37 abutting the pressing ramp 32 of the slide 31, a braking member 34 mounted on a lower end of the driven rod 33, and an elastic member 36 mounted on the driven rod 33 and biased between the housing 30 and the enlarged upper end 37 of the driven rod 33 to push the enlarged upper end 37 of the driven rod 33 toward the pressing ramp 32 of the slide 31. The slide 31 of each of the castor units 3 is connected with a respective one of the links 23.

In operation, when the links 23 are pulled, the slide 31 of each of the castor units 3 is driven by the respective link 23, and the pressing ramp 32 of the slide 31 is moved to press the driven rod 33 which moves the braking member 34 downward toward the roller 35 so that the braking member 34 is moved to press and brake the roller 35 so as to stop rolling movement of the roller 35.

On the contrary, when the links 23 are pushed, the slide 31 of each of the castor units 3 is driven by the respective link 23, and the pressing ramp 32 of the slide 31 is moved backward to release the driven rod 33 which is pushed upward by the restoring force of the elastic member 36 to move the braking member 34 upward so that the braking member 34 is moved to detach from the roller 35 so as to unlock the roller 35.

Accordingly, when the pedal 14 is stepped by a user, the propeller shaft 21 is driven to rotate the at least one rotation plate 22 which drives the links 23 to operate the castor units 3 so as to brake or position the castor units 3 simultaneously. In addition, the user only needs to tread the pedal 14 so as to operate the castor units 3 simultaneously so that the user can control the castor units 3 easily and quickly. Further, the linking unit 2 may include multiple rotation plates 22 and multiple links 23 to control multiple castor units 3 so that the number of the castor units 3 can be increased and decreased freely, thereby enhancing the versatility of the combination castor.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A combination castor comprising:
a control unit;
a linking unit connected with the control unit; and
at least two castor units connected with the linking unit;
wherein the control unit includes:
at least one mounting seat;
at least one bushing mounted in the at least one mounting seat and having an interior provided with a mounting hole; and
a pedal pivotally mounted on a side of the at least one mounting seat and having an interior provided with a driving hole aligning with the mounting hole of the at least one bushing;
the linking unit includes:
a propeller shaft extended through the mounting hole of the at least one bushing and combined with the driving hole of the pedal;
at least one rotation plate secured on the propeller shaft and rotatable in concert with the propeller shaft; and at least two links each having a first end pivotally connected with the at least one rotation plate and a second end pivotally connected with a respective one of the at least two castor units;
wherein the mounting hole of the at least one bushing has a hexagonal shape and is fitted onto the propeller shaft of the linking unit;
the propeller shaft of the linking unit has a hexagonal shape;
the driving hole of the pedal has a hexagonal shape and is fitted onto the propeller shaft of the linking unit.

2. The combination castor of claim 1, wherein
the propeller shaft of the linking unit is secured in the mounting hole of the at least one bushing so that the at least one bushing of the control unit is rotatable in concert with the propeller shaft of the linking unit and is rotatable in the at least one mounting seat of the control unit;
the at least one rotation plate of the linking unit contacts with and is rotated by the propeller shaft.

3. The combination castor of claim 1, wherein the at least one mounting seat of the control unit has a top provided with a top plate.

4. The combination castor of claim 1, wherein the pedal of the control unit has two tread portions formed on two opposite ends thereof.

* * * * *